US010234581B2

(12) United States Patent
Hu

(10) Patent No.: US 10,234,581 B2
(45) Date of Patent: Mar. 19, 2019

(54) SYSTEM AND METHOD FOR HIGH RESOLUTION SEISMIC IMAGING

(71) Applicant: Chaoshun Hu, Houston, TX (US)

(72) Inventor: Chaoshun Hu, Houston, TX (US)

(73) Assignee: Chevron U.S.A. Inc., San Ramon, CA (US)

(*) Notice: Subject to any disclaimer, the term of this patent is extended or adjusted under 35 U.S.C. 154(b) by 430 days.

(21) Appl. No.: 14/744,328

(22) Filed: Jun. 19, 2015

(65) Prior Publication Data

US 2016/0370481 A1 Dec. 22, 2016

(51) Int. Cl.

*G01V 1/32* (2006.01)
*G01V 1/28* (2006.01)
*G01V 1/30* (2006.01)

(52) U.S. Cl.

CPC .............. *G01V 1/282* (2013.01); *G01V 1/303* (2013.01); *G01V 2210/51* (2013.01); *G01V 2210/67* (2013.01); *G01V 2210/679* (2013.01)

(58) Field of Classification Search

CPC ......... G01V 2210/51; G01V 2210/679; G01V 2210/67; G01V 1/282; G01V 1/303

See application file for complete search history.

(56) References Cited

U.S. PATENT DOCUMENTS

2009/0010104 A1* 1/2009 Leaney .................. G01V 1/364 367/47
2012/0075954 A1* 3/2012 Xu ......................... G01V 1/303 367/38

* cited by examiner

*Primary Examiner* — Sujoy K Kundu
*Assistant Examiner* — L. Anderson
(74) *Attorney, Agent, or Firm* — Marie L. Clapp

(57) ABSTRACT

A method is described for high-resolution seismic imaging of complex subsurface volumes using a two-stage least-squares reverse time migration with two objective functions. A traveltime misfit objective function enables long-wavelength imaging and an amplitude misfit objective function enables short-wavelength imaging. The method may be executed by a computer system.

5 Claims, 4 Drawing Sheets

SYSTEM AND METHOD FOR HIGH RESOLUTION SEISMIC IMAGING

TECHNICAL FIELD

The disclosed embodiments relate generally to techniques for deriving seismic images of the subsurface from geophysical seismic data and, in particular, to a method of generating a high-resolution seismic image of the subsurface using a two-stage least-squares reverse time migration with two objective functions.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

Seismic data is processed to create seismic images that can be interpreted to identify subsurface geologic features including hydrocarbon deposits. This imaging may involve propagation of wavefields through a velocity model of the subsurface, also called forward modeling. In complex subsurface areas, such as near salt bodies, seismic images are often contaminated with artifacts.

There exists a need for improved seismic images that will allow better seismic interpretation of potential hydrocarbon reservoirs.

SUMMARY

In accordance with some embodiments, a method of seismic imaging may include receiving a seismic dataset representative of a subsurface volume of interest and a velocity model, transforming the seismic dataset into a high-resolution seismic image by a two-stage least-squares reverse time migration wherein a first stage derives a long-wavelength seismic image using a weighted normalized correlation-based traveltime misfit objective function and a second stage corrects short-wavelength details in the long-wavelength seismic image using an amplitude misfit objective function to generate the high-resolution seismic image, and identifying geologic features based on the high-resolution seismic image.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a manner of seismic imaging. These embodiments are designed to be of particular use for seismic imaging of subsurface volumes in geologically complex areas such as under or near salt bodies.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Seismic imaging of the subsurface is used to identify potential hydrocarbon reservoirs. Seismic data is acquired at a surface (e.g. the earth's surface, ocean's surface, or at the ocean bottom) as seismic traces which collectively make up the seismic dataset. Processing seismic data and generating seismic images is a very complicated procedure. This is particularly true in areas of geologic complexity, such as in faulted regions or near high-contrast rock boundaries (e.g. salt bodies).

The present invention includes embodiments of a method and system for producing high-resolution seismic images, also called broadband imaging. The method transforms seismic data into a high-resolution seismic image that may be interpreted to identify potential hydrocarbon reservoirs in the earth's subsurface. The transformation is accomplished by a two-stage least-squares reverse time migration.

Reverse time migration (RTM) involves forward propagation of a source wavefield (i.e., seismic modeling), backward propagation of a receiver wavefield, and correlation of source and receiver wavefields along the forward time axis at zero lag. RTM can be formulated as a least-squares inversion (LSRTM). However, conventional LSRTM cannot properly invert short-wavelength details and the resultant seismic image will suffer from poor resolution, particularly in regions near and below salt bodies.

Figure 1:
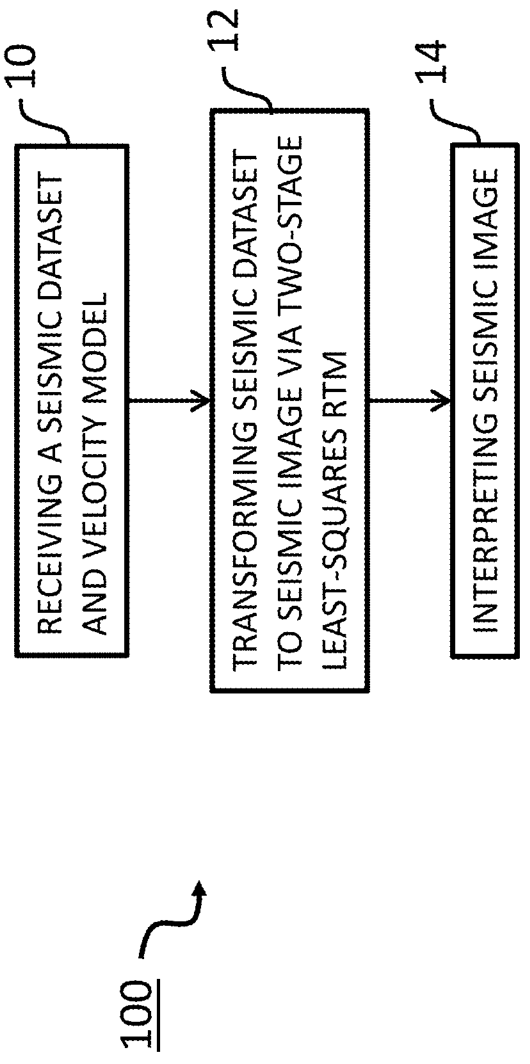
FIG. 1 illustrates a flowchart of a method of seismic imaging using two-stage reverse time migration, in accordance with some embodiments.

FIG. 1 illustrates a flowchart of a method 100 for seismic imaging of a complex subsurface volume of interest. At operation 10, a seismic dataset is received. As previously described, the seismic dataset includes a plurality of traces recorded at a plurality of seismic sensors. This dataset may have already been subjected to a number of seismic processing steps, such as deghosting, multiple removal, spectral shaping, and the like. These examples are not meant to be limiting. Those of skill in the art will appreciate that there are a number of useful seismic processing steps that may be applied to seismic data before it is deemed ready for imaging. A velocity model representative of the subsurface is also received. Although the velocity model is some form of "best guess", those of skill in the art are aware that velocity models often contain errors, particularly in complex areas such as those near salt boundaries. In some embodiments, the velocity model may be smoothed to reduce sharp transitions between rock formations.

At operation 12, the seismic data is transformed into a high-resolution seismic image by performing a two-stage least-squares reverse time migration (LSRTM). In one embodiment, the limited-memory Broyden-Fletcher-Goldfarb-Shanno (L-BFGS) method may be used in the LSRTM. L-BFGS maintains simple and compact approximations of Hessian matrix and is very useful for solving large problems. In addition, it may be used in a target-oriented way that will further reduce computational cost. The main idea of L-BFGS is to use curvature information from only the most recent iterations to construct the Hessian approximation. In detail, assume that the objective function is $\min_x f(x)$, where x represents the model space.

In the line search strategy, the algorithm chooses a direction $p_k$ and searches along this direction from the current model iterate $x_k$ for a new model iterate with a decreased objective function value, i.e., $\min_x f(x_k+\alpha_k p_k)$, where $\alpha_k$ is a positive scalar and represents step length and $p_k$ represents descent direction at the current model iterate.

Most line search algorithms require $p_k$ to be a descent direction and often has the form $$p_k=-B_k^{-1}\nabla f_k,$$

where $B_k$ typically is a symmetric and nonsingular matrix. In quasi-Newton methods, $B_k$ is an approximation to the Hessian $\nabla^2 f(x_k)$ that is updated at each iteration.

In one embodiment, it is possible to calculate the step-length parameter $\alpha_k$ using the Wolfe conditions which can be described by the following equations, $$f(x_k+\alpha_k p_k)\leq f(x_k)+c_1\alpha_k\nabla f_k^T p_k, \text{ and}$$

$$|\nabla f(x_k+\alpha_k p_k)^T p_k|\leq c_2|\nabla f_k^T p_k|,$$

where coefficients $c_1$ and $c_2$ satisfies $0<c_1<c_2<1$. Here T means transpose operator.

In an embodiment, each step of the L-BFGS method has the following form, $$x_{k+1}=x_k-\alpha_k H_k\nabla f_k,\ k=0,1,2,\ \ldots,$$

where $H_k$ is the inverse of Hessian approximation $B_k$ and is updated at each iteration by means of the formula, $$H_{k+1}=V_k^T H_k V_k+\rho_k y_k s_k^T,$$

$$\text{where } \rho_k=\frac{1}{y_k^T s_k},\ V_k=I-\rho_k s_k s_k^T,$$

$$\text{and } s_k=x_{k+1}-x_k,\ y_k=\nabla f_{k+1}-\nabla f_k.$$

The gradient of objective function may be calculated by the correlation of the source wavefields and receiver wavefields. In an embodiment, it may be desirable to use a Laplacian filter to reduce noise. During the computation, the source wavefields are calculated first and stored to memory at given time steps; later the source wavefields are loaded back and correlated with the calculated receiver wavefield to form the gradient.

The first stage of the LSRTM uses an objective function that minimizes traveltime misfit. This may be a weighted normalized correlation-based objective function:

$$E=\sum_i\sum_j\left[\frac{w_{ij}u_{ij}d_{ij}}{\sqrt{w_{ij}u_{ij}^2}\sqrt{w_{ij}d_{ij}^2}}\right]$$

where i and j are the source and receiver indices, respectively, u and d are the modelled and observed seismic data at a receiver, w are the Gaussian weighting coefficients which are applied to each time sample to maximum zero-lag energy. This traveltime misfit objective function will generate a seismic image for the long-wavelengths (i.e. low frequency). On the first stage, the following two stopping criteria will be checked during the iteration: 1) if the misfit reduces to a predefined small threshold value; 2) if the iteration number has amounted to the predefined maximum iteration number. Once either stopping criteria is satisfied, it will move to the second stage. The second stage of the LSRTM uses an amplitude misfit objective function:

$$E=\Sigma_i\Sigma_j\|u_{ij}-d_{ij}\|^2.$$

This objective function provides the short-wavelength (high frequency) details needed to generate a high-resolution seismic image.

Referring again to FIG. 1, once a high-resolution seismic image has been created, it can then be used for seismic interpretation 14. Interpretation of seismic horizons, particularly in regions near and below salt bodies, will be easier on the high-resolution seismic image as opposed to the seismic images produced by conventional seismic imaging methods. Interpretation of the seismic image may include picking horizons representative of geologic features by a human or automatically using any appropriate seismic interpretation software package.

Figure 2A:
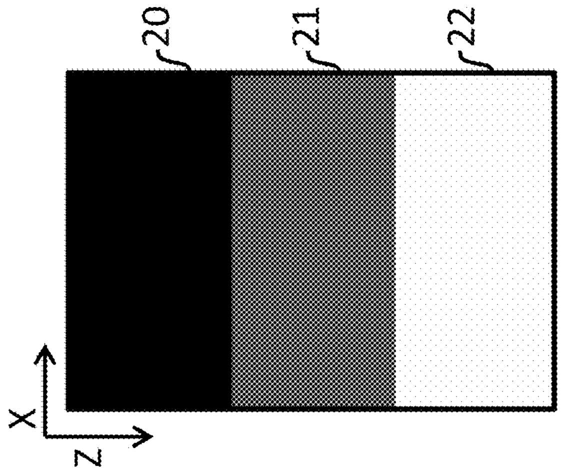
FIG. 2A is a simple velocity model.
Figure 2B:
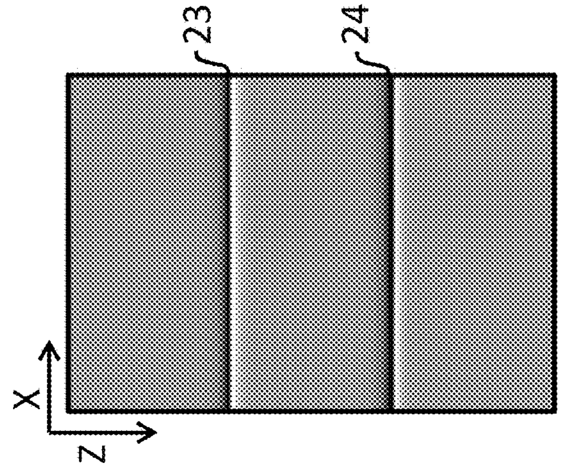
FIG. 2B is a true reflectivity model.

An example of an embodiment of the present invention is illustrated by FIGS. 2A-4. FIG. 2A is a subsurface velocity model with three layers labeled 20-22. FIG. 2B is the true reflectivity, also known as the true seismic image. It shows the upper reflectivity 23 at the boundary between layers 20 and 21 and the lower reflectivity 24 at the boundary between layers 21 and 22. Note that both FIG. 2A and FIG. 2B have axes of surface location X and depth Z. FIG. 2C is a single shot gather with seismic events 25 and 26. The axes of FIG. 2C are in offset H and traveltime t. The zero-offset location, where the receiver is at the same surface location as the shot (source), occurs in the middle of the offset axis 27. A seismic wave was produced at the shot location, traveled through the subsurface, reflected at the layer boundaries, and recorded at receivers located at various negative and positive offsets from the shot. Seismic event 25 is the recorded reflection from the boundary between layers 20 and 21 and seismic event 26 is the recorded reflection from the boundary between layers 21 and 22. The goal of seismic imaging is to take the seismic data (FIG. 2C) and transform it into a seismic image that is as close to the true reflectivity (FIG. 2B) as possible.

In practice, seismic imaging uses thousands or tens of thousands of seismic shot gathers to generate a seismic image. In this example, only one shot gather is being used for simplicity of understanding. However, when performing seismic imaging using a reverse time migration algorithm, even using only a single shot gather requires calculations of forward wave propagation, backward wave propagation, and cross-correlations that require significant computational power. Seismic imaging requires high-performance computers such as large clusters with hundreds of nodes to be practical.

Figure 2C:
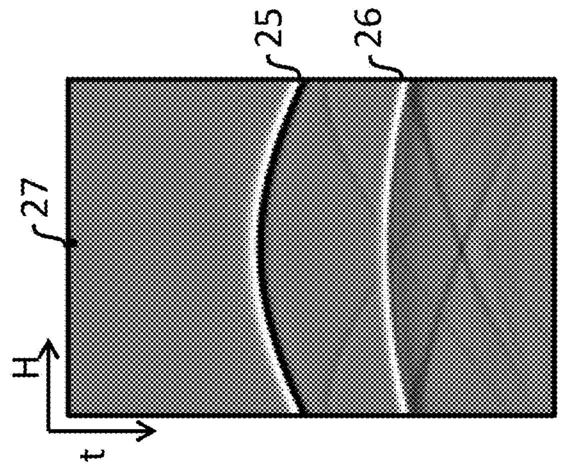
FIG. 2C is an exemplary seismic data shot gather.
Figure 3B:
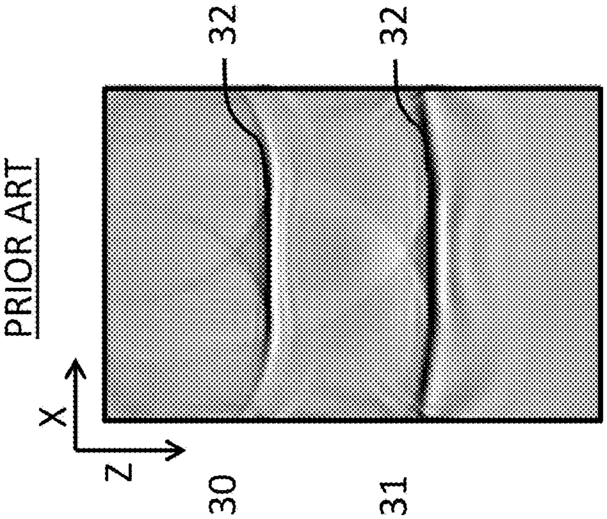
FIG. 3B is a seismic image produced by another conventional method.
Figure 3A:
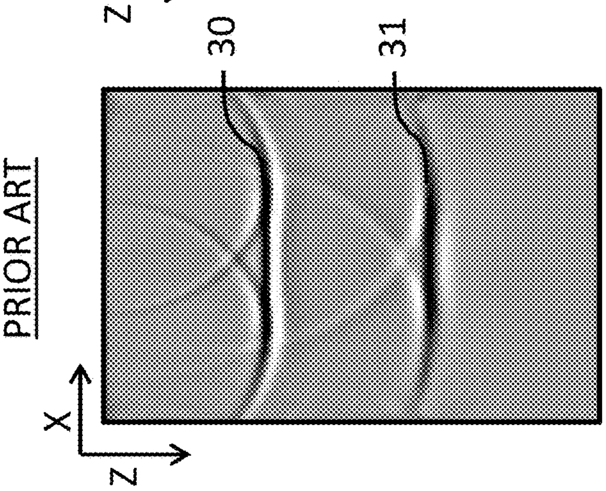
FIG. 3A is a seismic image produced by a conventional method.

FIGS. 3A and 3B show the result of conventional seismic imaging of the single shot in FIG. 2C. The seismic image in FIG. 3A is the result of reverse time migration. The upper event 30 and the lower event 31 are lower frequency (i.e. lower resolution, "fatter") than the true reflectivity in FIG. 2B. The seismic image in FIG. 3B is the result of least-squares reverse time migration and shows that upper event 32 and lower event 33 are higher frequency (i.e. higher resolution) than the events in FIG. 3A but are still lower frequency than the true reflectivity.

Figure 4:
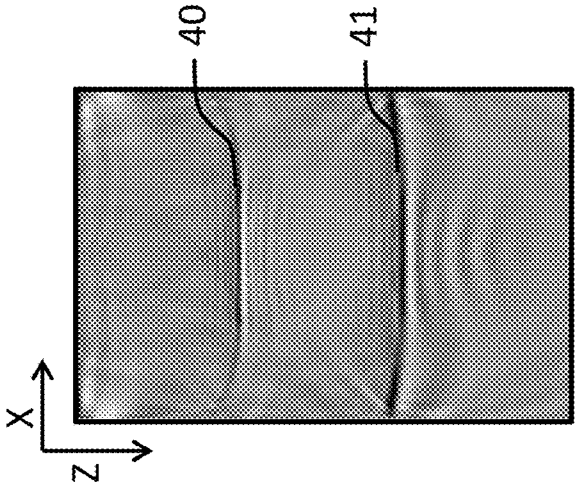
FIG. 4 is a seismic image produced by an embodiment of the present invention.

The seismic image in FIG. 4 is the result of an embodiment of the present invention using two-stage LSRTM. Upper event 40 and lower event 41 are both higher resolution than either the events in FIG. 3A or 3B and comparable to the resolution of the events in FIG. 2B. The seismic image generated by an embodiment of the present invention is better than either conventional result.

When interpreting a seismic image, seismic horizons are identified and traced throughout the subsurface volume of interest. Oftentimes, this volume of interest is near or below salt bodies because salt provides a good trap for potential hydrocarbon reservoirs. Improving the resolutions of events near or below salt allows better interpretation. This may impact hydrocarbon reservoir delineation and well planning.

Figure 5:
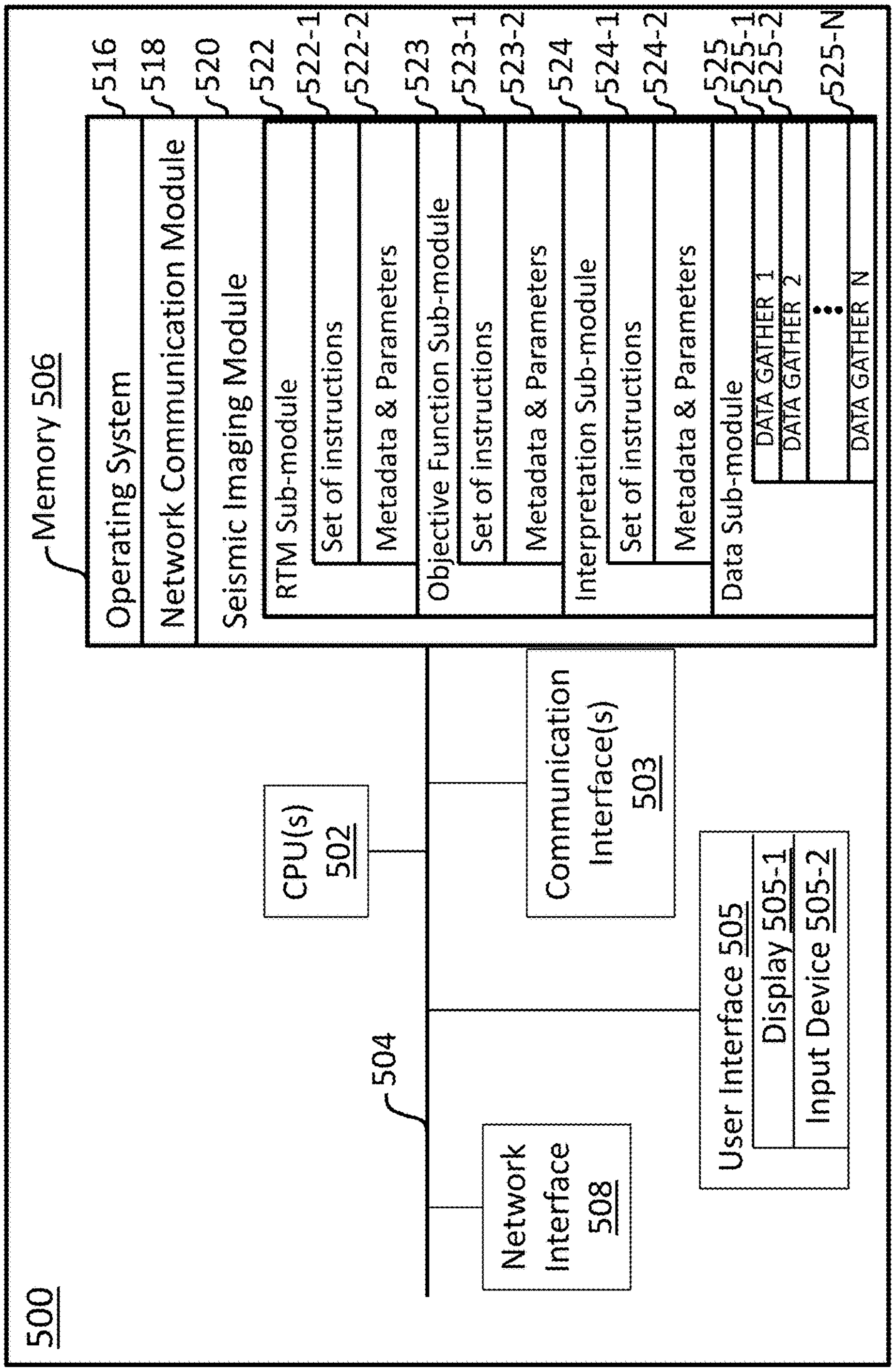
FIG. 5 is a block diagram illustrating a seismic imaging system, in accordance with some embodiments.

FIG. 5 is a block diagram illustrating a seismic imaging system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the seismic imaging system 500 includes one or more processing units (CPUs) 502, one or more network interfaces 508 and/or other communications interfaces 503, memory 506, and one or more communication buses 504 for interconnecting these and various other components. The seismic imaging system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, and/or geologic structure information.

In some embodiments, memory 506 or the non-transitory computer readable storage medium of memory 506 stores the following programs, modules and data structures, or a subset thereof including an operating system 516, a network communication module 518, and a seismic imaging module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the seismic imaging module 520 executes the operations of method 100. Seismic imaging module 520 may include data sub-module 525, which handles the seismic dataset including seismic gathers 525-1 through 525-N. This seismic data is supplied by data sub-module 525 to other sub-modules.

RTM sub-module 522 contains a set of instructions 522-1 and accepts metadata and parameters 522-2 that will enable it to execute operation 12 of method 100. The objective function sub-module 523 contains a set of instructions 523-1 and accepts metadata and parameters 532-2 that will enable it to contribute to operation 12 of method 100. The interpretation sub-module 524 contains a set of instructions 524-1 and accepts metadata and parameters 524-2 that will enable it to execute at least operation 14 of method 100. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the seismic image. For example, any of the sub-modules may optionally be able to generate a display that would be sent to and shown on the user interface display 505-1. In addition, any of the seismic data or processed seismic data products may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 5) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of seismic imaging, comprising:

a. receiving, at a computer processor, a seismic dataset representative of a geologically complex subsurface volume of interest and a velocity model;

b. transforming, via the computer processor, the seismic dataset into a high-resolution seismic image by a two-stage least-squares reverse time migration wherein a first stage derives a long-wavelength seismic image using a weighted normalized correlation-based traveltime misfit objective function and a second stage corrects short-wavelength details in the long-wavelength seismic image using an amplitude misfit objective function to generate the high-resolution seismic image of the geologically complex subsurface volume of interest; and c. identifying geologic features based on the high-resolution seismic image, wherein the geologic features include salt bodies that trap hydrocarbon reservoirs.

2. The method of claim 1 wherein the traveltime misfit objective function is $$E=\sum_i\sum_j\left[\frac{w_{ij}u_{ij}d_{ij}}{\sqrt{w_{ij}u_{ij}^2}\sqrt{w_{ij}d_{ij}^2}}\right]$$

and wherein i and j are source and receiver indices, respectively, u and d are modelled and observed seismic data at a receiver, and w are Gaussian weighting coefficients which are applied to each time sample to maximum zero-lag energy.

3. The method of claim 1 wherein the amplitude misfit objective function is $$E=\Sigma_i\Sigma_j\|u_{ij}-d_{ij}\|^2$$

and wherein i and j are source and receiver indices, respectively, and u and d are modelled and observed seismic data at a receiver.

4. A computer system, comprising:

one or more processors;

memory; and one or more programs, wherein the one or more programs are stored in the memory and configured to be executed by the one or more processors, the one or more programs including instructions that when executed by the one or more processors cause the device to:

transform a seismic dataset representative of a geologically complex subsurface volume of interest into a high-resolution seismic image by a two-stage least-squares reverse time migration wherein a first stage derives a long-wavelength seismic image using a weighted normalized correlation-based traveltime misfit objective function and a second stage corrects short-wavelength details in the long-wavelength seismic image using an amplitude misfit objective function to generate the high-resolution seismic image of the geologically complex subsurface volume of interest; and identify geologic features based on the high-resolution seismic image, wherein the geologic features include salt bodies that trap hydrocarbon reservoirs.

5. A non-transitory computer readable storage medium storing one or more programs, the one or more programs comprising instructions, which when executed by an electronic device with one or more processors and memory, cause the device to transform a seismic dataset representative of a geologically complex subsurface volume of interest into a high-resolution seismic image by a two-stage least-squares reverse time migration wherein a first stage derives a long-wavelength seismic image using a weighted normalized correlation based traveltime misfit objective function and a second stage corrects short-wavelength details in the long-wavelength seismic image using an amplitude misfit objective function to generate the high-resolution seismic image of the geologically complex subsurface volume of interest; and identify geologic features based on the high-resolution seismic image, wherein the geologic features include salt bodies that trap hydrocarbon reservoirs.

* * * * *